United States Patent Office 3,301,020
Patented Jan. 31, 1967

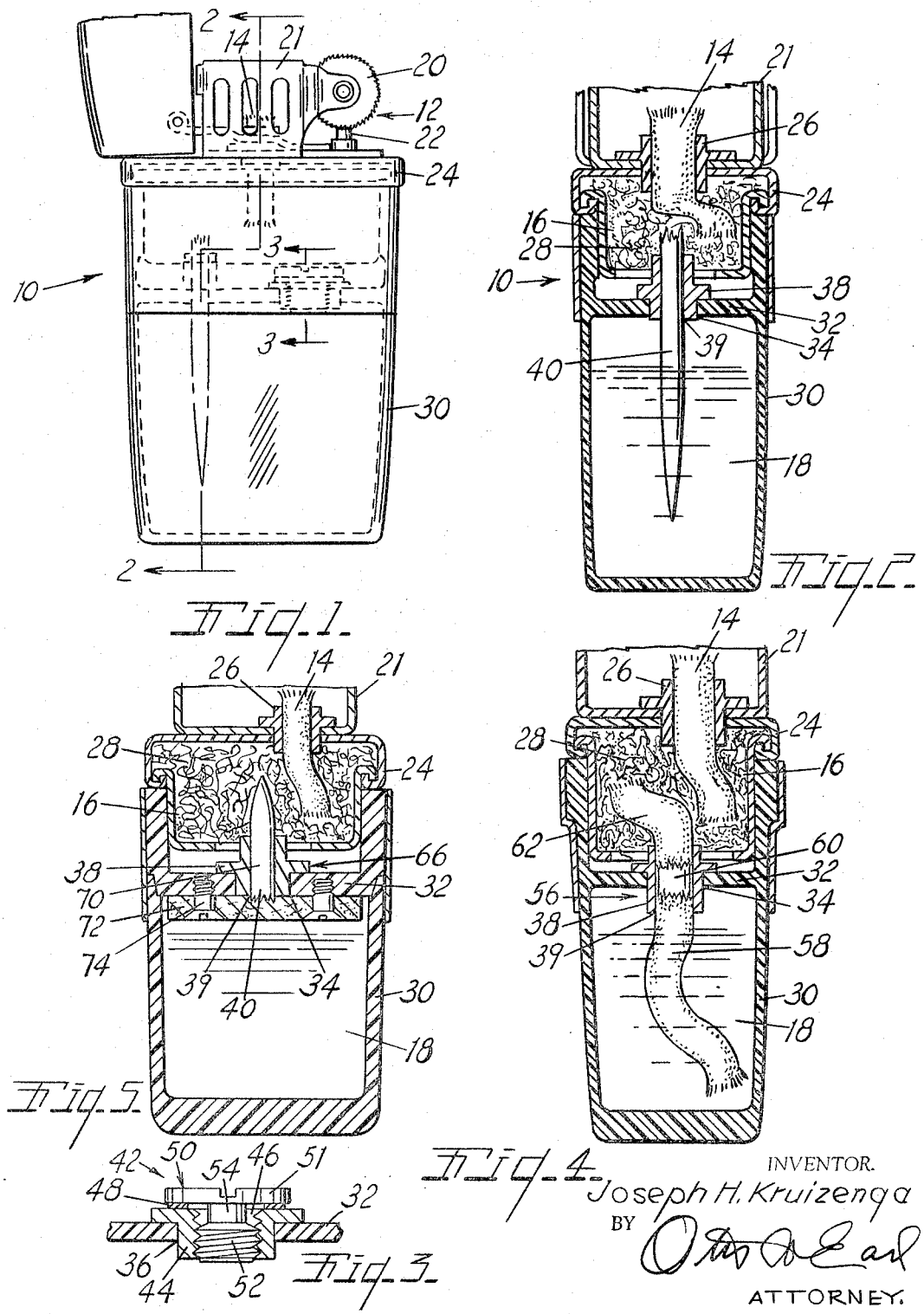

3,301,020
RESERVE FUEL TANK LIGHTERS
Joseph H. Kruizenga, 410 Parchmount,
Kalamazoo, Mich. 49004
Filed Feb. 26, 1965, Ser. No. 435,437
10 Claims. (Cl. 67—7.1)

This invention resides in the mechanical arts. It pertains to cigar and cigarette lighters and the like, and particularly to lighters of the reserve fuel tank type.

Recently, reserve fuel tank type lighters have gained popularity. These are cigar and cigarette lighters which comprise sparking means operatively and structurally associated with one end of a wick, the other end of which is in a wick fueling chamber substantially filled with a porous material such as, for example, loosely packed cotton or the like, a tank or compartment for holding a reserve supply of liquid fuel, and a fuel passageway which can include another wick, for conveying liquid fuel from the reserve fuel supply tank to the wick fueling chamber. In a number of commercial embodiments of these lighters the reserve fuel tank is constructed of clear plastic material and frequently a fisherman's fly is inside the tank for decorative purposes.

A problem with these reserve fuel tank type lighters is that the wick fueling chamber and primary wick tend to flood, particularly whenever these lighters are inverted for an excessive period of time. This makes it difficult to light the wick by operation of the sparking means. Moreover, this flooded condition causes flaring when the wick does catch fire. It results in loss of fuel at the primary wick by excessive evaporation and even by liquid flow which is manifested by drippage that can seep into clothing and onto skin. This invention in one general embodiment provides a solution to this problem.

Another problem associated with reserve fuel tank type lighters is that the filler plug assembly associated with the reserve fuel tank tends to leak, particularly after the gasket usually involved therein has become slightly worn or out of shape. This invention in another general embodiment provides a solution to this problem.

In summary, this invention in one general embodiment comprises an improvement in reserve fuel tank type lighters in that it provides a metering element in the fuel passageway between the reserve fuel tank and the wick fueling chamber. This metering element comprises a plug consisting essentially of hardwood with the grain thereof running in the direction of fuel flow, which plug occupies substantially all of a cross-section of the fuel passageway between the reserve fuel tank and the wick fueling chamber.

This invention in another general embodiment provides another improvement in reserve fuel tank type lighters in that it provides a more highly efficient filler plug assembly for the reserve fuel tank. In general the filler plugs of most lighters having such are screws which in combination with a gasket operate to plug the filler opening when screwed into said opening. Under the concepts of this general embodiment of the invention the filler plug shank adjacent the head thereof has an annular recess between the head and the threaded portion of the shank, which recess from the head to the threaded portion preferably has at least substantially the same dimension as the thickness of the gasket prior to use and generally a greater dimension.

This invention is further described in the context of the figures of the drawing, which form a material part of the disclosure. In the drawings:

FIG. 1 is a side view of a specific embodiment of a preferred reserve fuel tank type lighter with the improvements of this invention;

FIG. 2 is a cross sectional view of the lighter of FIG. 1, which view is generally indicated by the sectioning lines 2—2 in FIG. 1;

FIG. 3 is a cross sectional view of the filler plug assembly employed in the lighter of FIG. 1, which view is generally indicated by the sectioning lines 3—3 in FIG. 1.

FIG. 4 is a cross sectional view of a specific embodiment of another preferred embodiment of a reserve fuel tank lighter with the improvements of this invention, the sectioning lines for this view being in substance the same as the sectioning lines 2—2 in FIG. 1; and FIG. 5 is a cross sectional view of a specific embodiment of still another preferred embodiment of a reserve fuel tank lighter with the improvements of this invention, the sectioning lines for this view being in substance the same as the sectioning lines 2—2 in FIG. 1.

In greater detail, FIGS. 1 and 2 show reserve fuel tank lighter 10. This lighter comprises sparking means 12, a wick 14, a wick fueling chamber 16 and a reserve fuel tank 18.

The sparking means 12 comprises a sparking wheel 20 rotatably mounted on a wind guard 21, and a flint 22 which by means of a spring assembly (not shown) bears against the sparking wheel. The flame end of the wick 14 is within the wind guard 21 and in spark receiving position relative to the sparking means 12.

The wick fueling chamber 16 is defined by a housing 24 having top, side and end walls. Mounted on the top wall are the wind guard 21 and the sparking means 12. The top wall comprises a wick holder 26 through which the wick 14 passes into the interior of the wick fueling chamber 16. The interior of the wick fueling chamber 16 is substantially filled with a porous material 28 which, in the embodiment shown, consists essentially of loosely packed cotton. Other porous materials can be employed, however.

The reserve fuel tank 18 is defined by a casing 30 having bottom, side and end wall members and a partition member 32 intermediate the top and bottom of the casing 30. The partition member 32 forms the top wall of the reserve fuel tank 18. Above the partition member and seated in press fit in the casing 30 is the housing 24 of the wick fueling chamber 16.

The partition member 32 has two holes 34 (see FIG. 2 and 36 (see FIG. 3) therethrough. As shown in FIG. 2, seated in one hole (34) in tight fit is a bushing 38. The bushing 38 defines a passage or conduit 39 in which in friction fit is a metering element 40. The metering element 40 extends from deep in the reserve fuel tank 18 into the wick fueling chamber 16. The metering element 40 according to the concepts of this invention consists essentially of hardwood with the grain running in the direction of normal fuel flow. Preferably one end of the metering element 40 is tapered or pointed for ease of insertion of it into the passageway 39 of the bushing 38, and preferably the other end of the metering element is in jagged condition so as to provide open fibers. The appearance of the metering element 40 is that of a broken toothpick. Indeed, in an experimental model of this embodiment of the invention the metering element 40 employed was a broken toothpick. Preferably substantially the entire area of a transversely disposed plane or cross sectional plane of the passageway 39 is occupied by the metering element 40 and preferably in that plane the metering element is in a constricted condition. This can be accomplished by employing a metering element 40 having the same cross-sectional shape as the passageway 39 and in said plane a slightly greater cross-sectional area than that of said passageway 39 in said plane. For example, in a preferred specific embodiment, the passageway 39 is cylindrical with a diameter, for instance, of 2/32 inch and the metering element is a birch wood dowel having a 5/64–6/64 inch diameter prior to insertion into the passageway 39.

The metering element 40 functions, when a portion thereof in the reserve fuel tank 18 is immersed in liquid fuel such as the liquid hydrocarbons usually employed in lighters of this type (so-called lighter fluid), to soak up the liquid fuel and transmit it from the reserve fuel tank 18 into the wick fueling chamber 16. As long as the porous material 28 in the region of the end of the metering element 40 is not saturated with the liquid fuel, liquid fuel will flow from the reserve fuel tank 18 through the metering element 40 into the wick fueling chamber 16. However, when the pourous material 28 in the region of the end of the metering element 40 tends to become saturated or soaked with liquid fuel, the metering element 40 tends to swell or expand and in so doing, stops the flow of liquid fuel from the reserve fuel tank 18 into the wick fueling chamber 16. Hence, with the metering element 40 in position and functioning properly, the porous material 28 in general and the wick 14 never become soaked with the liquid fuel. The porous material 28 and the wick 14 take up as a result of the metering element 40 only their normal capacities of liquid fuel. This results in two advantages: fuel evaporation from the wick 14 is slower than from a soaked or overloaded wick and secondly, the wick 14 contains just enough lighter fuel so that when the sparking means 12 is actuated fuel is ignited and burns without a flaring flame.

The second hole 36 in the partition member of the casing 30 in the embodiment of FIGS. 1 and 2 contains as shown in FIG. 3 a filler plug assembly of this invention. This comprises a bushing 44 in tight fit in the hole 36, which bushing has an internally threaded opening 46 therethrough. This opening 46 provides an entrance for introducing liquid fuel into the reserve fuel tank 18. To close this entrance, the filler plug assembly 42 comprises an annular gasket 48 and a filler plug 50.

The filler plug 50 is basically a screw having a head 51 and a shank. The shank has a threaded portion 52 and adjacent the head of the filler plug a portion 54 which is annularly recessed relative to the threaded portion 52. The dimension of the annularly recessed portion 54 from the head 51 to the threaded portion 52 of the shank is preferably at least substantially the thickness of the gasket 48 prior to its being compressed under the head 51 of the filler plug 50, and generally greater than said thickness. The axial length of the threads on the plug is thus necessarily less than the length of the threads on the bushing 44. Consequently, when the filler plug 50 is screwed into the internally threaded opening 46 of the bushing 44, the internal play between the plug 50 and the bushing 44 enables the head 51 of the filler plug 50 to bear against or press evenly on substantially all parts of the annular gasket 48. As a result, a highly efficient filler plug assembly is obtained.

In the reserve fuel tank type lighter embodiment of FIGS. 1 and 2, it is intended that the wick fueling chamber housing 24 be removed from the casing 30 when it is desired to fill the reserve fuel tank 18 with fuel. Thereafter, the wick fueling chamber housing 24 is inserted into place in the receptacle therefor provided by the casing 30. In the embodiments illustrated by FIGS. 4 and 5, the wick fueling chamber housing 24 is intended to be permanently disposed in the casing 30. The filler plug assembly in each of these embodiments, which is not shown, but which is substantially the same as the filler plug assembly 42 of FIG. 3, is in the bottom wall of the reserve fuel tank casing 30.

In the embodiment shown in FIG. 4 fuel is introduced into the wick fueling chamber 16 from the reserve fuel tank 18 by a fuel conveyor assembly 56.

The fuel flow assembly 56 comprises a bushing 38 positioned in tight fit in a hole 34 through the partition member 32 of the reserve fuel tank casing 30. In this embodiment the partition member 32 has only one hole (34) therethrough. The bushing 38 defines a passageway 39 in which in order are one end of a reserve fuel tank wick 58, a metering element 60 and one end of a wick fueling chamber feed wick 62. The reserve fuel tank wick 58 extends from deep within the reserve fuel tank 18 into the passageway 39 of the bushing 38 whereat it contacts the metering element 60. The metering element 60 is a plug which consists essentially of hardwood with the grain thereof running in the direction of normal fuel flow. Both ends of the metering element 60 are in jagged condition so as to provide open fibers for embedment in the fibrous ends of the reserve fuel tank wick 58 and the wick fueling chamber feed wick 62. Preferably, as in the embodiment of FIGS. 1 and 2, the metering element 60 occupies substantially the entire area of a transverse plane of the passageway 39 of the bushing 38 and in that plane preferably is in constricted condition compared to its condition prior to placement in the passageway 39. The wick fueling chamber feed wick 62 extends from the metering element 60 through the passageway 39 into the wick fueling chamber 16 wherein it is buried in the porous material 28 which substantially fills the wick fueling chamber 16.

With a portion of the reserve fuel tank wick 58 immersed in fuel in the reserve fuel tank 18, there is a flow of fuel from the reserve fuel tank 18 through the reserve fuel tank wick 58, the metering element 60 and the feed wick 62 into the wick fueling chamber 16. As long as the porous material 28 in the region of the end of the feed wick 62 is not soaked or saturated with liquid fuel, this flow of liquid fuel continues. However, when the porous material 28 in the region of the end of the feed wick 62 approaches the point of saturation and thus the feed wick 62 becomes soaked with fuel, the metering element 60 functions to restrict or shut off the flow of fuel from the reserve fuel tank wick 58. When the fuel concentration of the porous material 28 in the region of the feed wick 62 decreases, the metering element 60 functions to permit flow of fuel into the feed wick 62 and thus into the wick fueling chamber 16.

In the embodiment of the reserve fuel tank type lighter of this invention, which is illustrated in FIG. 5, fuel is introduced to the wick fueling chamber 16 from the reserve fuel tank 18 by means of a fuel conductor assembly 66.

The fuel conductor assembly 66 comprises a bushing 38 seated in tight fit in a hole 34 through the partition member 32 of the reserve fuel tank casing 30. In this embodiment the partition member 32 has but one hole (34) therethrough. The bushing 38 again defines a passageway 39 in which in friction fit is a metering element 70. The metering element 70 is a plug consisting essentially of hardwood with the grain running in the direction of normal fuel flow. Preferably one end of the metering element 70 is tapered or pointed for ease of insertion of it into the passageway 39 of the bushing 38 and preferably the other end of the metering element is in jagged condition so as to provide open fibers. Again, the appearance of the metering element 70 is that of a broken toothpick. Preferably, substantially the entire area of a cross-sectional plane of the passageway 39 is occupied by the metering element 70 and preferably in that plane the metering element 70 is in a constricted condition. This condition is achieved by a metering element 70 having the same cross-sectional shape as the passageway 39 and in said plane, prior to placement in said passageway, a slightly greater cross-sectional area than that of said passageway 39 in said plane. Also, in this case it is preferred that the pointed end of the metering element be buried in the porous material 28 in the wick fueling chamber 16.

In this embodiment the fuel conductor assembly 66 also comprises a pad 72 of porous material such as, for example, cotton or the like. This pad 72 is in the reserve fuel tank 18 and is secured to the partition member 32 of the reserve fuel tank casing 30. In position it covers the passageway 39 through the bushing 38. The jagged end of the metering element 70, which preferably protrudes into the reserve fuel tank 18, is embedded in the pad 72. In this embodiment fuel from the reserve fuel tank 18 is introduced into the wick fueling chamber 16 by tilting the lighter upside down, whereby the pad 72 absorbs fuel. By capillary action the fuel travels from the pad 72 through the metering element 70 into the porous material 28 in the wick fueling chamber 16. As long as in the wick fueling chamber 16 the porous material 28 in the region of the end of the metering element 70 is not soaked with fuel, fuel flow will continue until the concentration of fuel in the pad 72 in the region of the jagged end of the metering element 70 is about the same as that in the region of the pointed end of the metering element 70 in the wick fueling chamber 16 or until the concentration of fuel in the porous material 28 in the wick fueling chamber 16 in the region of the pointed end of the metering element 70 approaches the saturation point. In the latter case, the metering element 70 functions to shut off the flow of fuel therethrough. The pad 72 functions in this embodiment not only to hide the jagged end of the metering element 70, which is desirable when the casing 30 of the reserve fuel tank 18 is of a clear or transparent material, but also makes necessary the tilting of the lighter for a substantial length of time in order to fuel up the wick fueling chamber 16 to the limit imposed by the metering element 70.

Thus, this invention provides an improved reserve fuel tank type lighter. The improvements of this invention reduce the loss of fuel from the lighter. Furthermore, the metering element improvement of this invention makes possible the fueling of the wick fueling chamber 16 without ever exceeding the fuel holding capacity of the porous material therein.

Other features, advantages and embodiments of this invention will become readily apparent to those in the exercise of ordinary skill in the art after reading the foregoing disclosures. In this connection, while specific embodiments of the improved lighter of this invention have been described in considerable detail, variations and modifications of these embodiments can be effected without departing from the spirit and scope of the invention as disclosed and claimed.

I claim:

1. In a cigarette lighter comprising sparking means operatively and structurally associated with one end of a wick, the other end of which is in a wick fueling chamber substantially filled with a porous material, a reserve fuel tank for holding a reserve supply of fuel secured to said fueling chamber, and means for conveying fuel from said reserve fuel tank to said wick fueling chamber, the improvement which comprises: means for controlling the flow of fuel from said reserve fuel tank into said wick fueling chamber, said means consisting of a wall forming a tube-like passageway between said wick fueling chamber and said reserve fuel tank, and a plug of hard wood fitting in tightly engaged and closing position in said passageway with the capillary passages formed by the grain of the wood extending longitudinally of the passageway and substantially stopping the flow of fuel when said porous material in the region of said wick substantially reaches its limit of absorption of said fuel.

2. A lighter as defined in claim 1 in which said plug projects into said fueling chamber.

3. A lighter as defined in claim 2 in which said plug has a roughly fractured end imbedded in the porous material in said fueling chamber.

4. A lighter as defined in claim 1 in which said plug projects a substantial distance into said reserve fuel tank.

5. A lighter as defined in claim 4 in which said plug is a hard wood member with a roughly fractured end projecting into the porous material in said fueling chamber, and a mechanically finished but unsealed end projecting into said reserve tank.

6. A lighter as defined in claim 5 in which said reserve fuel tank has transparent lower walls and is adapted to hold fuel in free liquid form.

7. A lighter as defined in claim 1 in which said plug has rough fractured ends located within said passageway,
    a second wick positioned in the porous material in said fueling chamber and having an end confined in said passageway in close contact with the end of said plug,
    and a third wick extending into said reserve tank and having one end confined in said passage in close contact with the opposite end of said plug from said second wick,
    the ends of said plug having broken jagged edges.

8. A lighter as defined in claim 1 in which said reserve tank has a pad of absorbent material positioned over the end of said passage and one end of said plug is roughly fractured and imbedded in said pad,
    said reserve fuel tank being adapted to hold fuel in free liquid form.

9. A lighter as defined in claim 1 in which said reserve fuel tank is made of transparent material with a partition forming said passageway and an annular flange extending around the passageway and supportingly receiving the walls of said refueling chamber,
    a filling opening formed through a wall of said reserve tank and having internal threads formed around the opening,
    a screw plug removably engaged with the threads of said opening and having a shank of lesser diameter than said threads,
    a head on said plug overlying the edges of said opening,
    and a gasket adapted to be sealed to said wall by said head.

10. A lighter as defined in claim 9 in which said filling opening is formed in said partition.

References Cited by the Examiner

UNITED STATES PATENTS

| | | | |
|---|---|---|---|
| 1,941,873 | 1/1934 | Aronson | 67—7.1 |
| 2,262,806 | 11/1941 | Kempf | 67—7.1 |
| 2,490,300 | 12/1949 | Hettinger | 67—7.1 |
| 2,521,180 | 9/1950 | Morse | 67—7.1 |
| 2,618,952 | 11/1952 | Peterson | 67—7.1 |
| 2,800,007 | 7/1957 | Kruizenga | 67—7.1 |
| 2,881,608 | 4/1959 | Lockwood | 67—7.1 |
| 3,109,552 | 11/1963 | Miller | 220—39 X |

EDWARD J. MICHAEL, *Primary Examiner.*